June 8, 1965 M. BOREL 3,187,571

FLOW MEASURING APPARATUS

Filed Aug. 21, 1961

INVENTOR.
Mark Borel
BY
Hovey, Schmidt, Johnson & Hovey
ATTORNEYS.

United States Patent Office 3,187,571
Patented June 8, 1965

3,187,571
FLOW MEASURING APPARATUS
Mark Borel, Prairie Village, Kans., assignor, by mesne assignments, to Jules Borel & Co., Kansas City, Mo., a corporation of Missouri
Filed Aug. 21, 1961, Ser. No. 132,615
5 Claims. (Cl. 73—230)

This invention relates to flow measuring apparatus particularly adaptable for use in hospitals to measure with accuracy the amount of oxygen or like fluids being administered to patients.

It is, therefore, the primary object of this invention to provide flow measuring apparatus which is accurate, easy to read, economical to manufacture, and not likely to become maladjusted or lose its accuracy during use.

Another object of this invention is to provide flow measuring apparatus having a hollow body, there being a turbine rotatably carried within said body and adapted to be actuated by the flow of fluid through the body, there being suitable mechanism coupled with the turbine whereby the rate of flow of the fluid as represented in revolutions of the turbine, may be accurately measured and indicated upon means carried by the apparatus.

Yet another object of this invention is to provide flow measuring apparatus capable of measuring with accuracy, the precise amount of oxygen being administered to a patient, the oxygen passing through the apparatus by means of a manifold which is carried therewithin in proximal relationship to a rotatably mounted turbine wheel, there being multiple openings in the wall of the manifold adjacent the turbine wheel, the openings being disposed to direct the oxygen passing therethrough perpendicularly against the vanes of the wheel whereby the flow of a relatively large amount of gas may be efficiently and accurately measured as it passes through the flow measuring apparatus.

Other objects include details of construction such as the structural features of the turbine wheel and its associated manifold, as well as the manner in which said components and remaining structural parts, such as the gear train and indicating means are carried by and within the hollow body of the apparatus.

Figure 1:
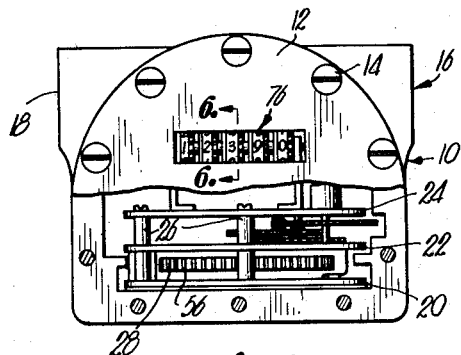
FIGURE 1 is a front elevational view of the flow measuring apparatus with the cover plate being partially broken away to reveal details of construction.
Figure 2:
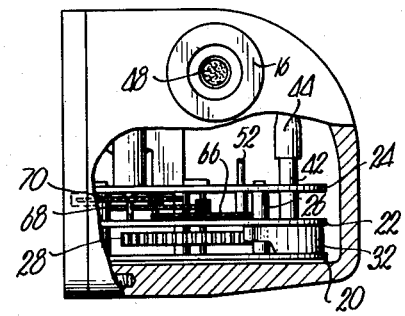
FIG. 2 is a side elevational view thereof, the body being partially broken away to reveal details of construction.

The present flow measuring apparatus is adapted to meet the demand for instruments which will accurately measure the amount of oxygen which is given to a particular patient, such measurement being obtained wholly by the instrument and without the need for additional record keeping or the like.

As is well known, oxygen and similar fluids, are administered to patients in hospitals and other institutions in varying quantities and at different times. Thus, a given tank of oxygen or the like may, during its life, be utilized for many patients, or oxygen may be administered to a number of patients from one or more tanks simultaneously. It is, of course, important to measure and record the particular amount of oxygen given any one patient, and the subject matter of the present invention is intended to fulfill this need.

The flow measuring apparatus hereinafter described, by virtue of its construction, will accurately and satisfactorily measure the flow of oxygen from a tank to any given patient, the rate of flow being represented by the number of revolutions of the turbine of the subject apparatus and the revolutions of said turbine being suitably recorded on indicia means forming a part of the apparatus.

The instant apparatus is designed to have its greatest accuracy at the point of usual and average flow in the case of oxygen administration, and thus, based upon surveys and experience, the present apparatus is designed and rendered adjustable to be most accurate, for example, in a range of from 2 to 16 liters per minute.

Referring to the drawing, the numeral 10 represents a hollow body, the major portion thereof being formed from a single piece of material with an opening at the front thereof, the said opening being closed by a cover plate 12 secured to the remainder of the body by screws such as 14, whereby to present a completely closed body, the only access thereto being through inlet bore 16 and outlet opening 18.

Disposed within hollow body 10 at spaced intervals, are a plurality of plates 20, 22 and 24, said plates normally being disposed in horizontal relationship and being maintained in their relative spaced positions by means of spacers such as 26. Thus, plates 20, 22 and 24 are securely mounted within the hollow body 10 and are so retained by said spacers 26.

A turbine wheel broadly designated as 28, is mounted between plates 20 and 22 in a horizontal position, the turbine wheel 28 being rotatable about a shaft 30 disposed centrally thereof, the said turbine wheel preferably being formed from a suitable plastic material.

Figure 3:
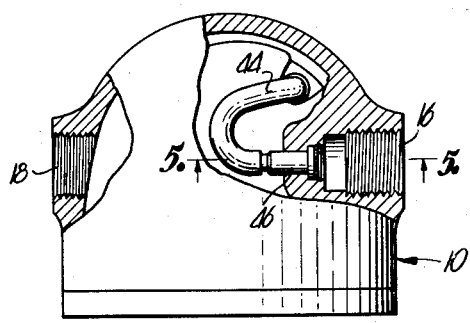
FIG. 3 is a top plan view, portions of the body being broken away to reveal details of construction.
Figure 5:
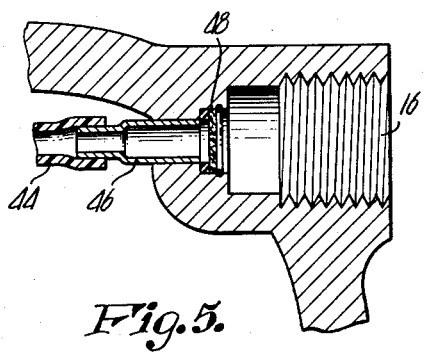
FIG. 5 is a sectional view on line 5—5 of FIG. 3.
Figure 4:
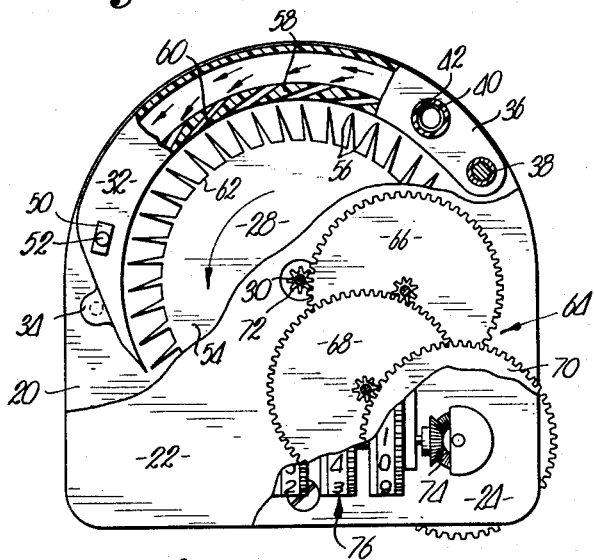
FIG. 4 is an enlarged, plan view, parts being broken away to reveal details of construction.
Figures 6, 7:
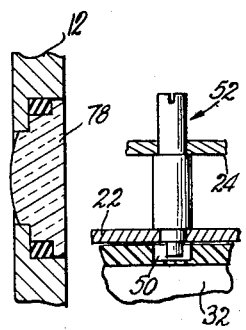
FIG. 6 is a sectional view on line 6—6 of FIG. 1.
FIG. 7 is a fragmentary, sectional view showing the adjusting pin and its relation to adjacent parts.

Disposed adjacent turbine 28 and also between plates 20 and 22, is an arcuate manifold broadly designated as 32, said manifold embracing a portion of turbine wheel 28, all as is clearly illustrated in FIG. 4 of the drawing. The manifold 32 is preferably formed from a plastic material and may be made from two substantially identical halves joined together as at boss 34 by provision of means carried by one of said halves engaging a hole formed in the other of said halves. Manifold 32 is pivotally mounted at one end 36 thereof as by a pivot pin 38, said one end 36 of manifold 32 also being coupled with inlet bore 16 by means of a hole 40 formed in said one end 36 of the manifold 32 and having a tubular member 42 carried thereby and communicating therewith, said tubular member 42 being coupled at its end opposite to that interconnected with hole 40, to a flexible tube 44, which tube 44 is suitably secured to a nozzle 46 which communicates with inlet bore 16, all as is clearly illustrated in FIGS. 3 and 5 of the drawing. Interposed between nozzle 46 and inlet bore 16 is a filter 48 adapted to remove undesirable elements from the oxygen or similar fluid as it enters the subject apparatus through bore 16 and continues its movement through nozzle 46, tube 44 and tubular member 42 into manifold 32.

The opposite end of manifold 32 has a slot 50 formed therein, which slot receives a portion of an upstanding pin 52, the pin 52 being cylindrical in cross section throughout its major length, but having an eccentric, cylindrical portion at the end thereof which is received within slot 50 whereby, upon rotation of pin 52, the eccentric portion thereof will engage the edges of slot 50 and thus cause shifting movement of manifold 32 about pivot pin 38.

Thus, it will be appreciated that through the foregoing adjusting means, and particularly through the rotation of pin 52 and its engagement through an eccentric portion thereof with slot 50, the spacing between manifold 32 and turbine 28 may be adjusted whereby to accommodate the subject apparatus for various rates of flow and secure adjustment thereof for the maximum possible accuracy.

Turbine 28 includes a drum 54 having a plurality of substantially identical, triangular-shaped vanes 56 extending radially from the drum 54, each of the vanes being of the same configuration and having the base portion thereof adjacent the drum and the apex thereof spaced from the drum and being in slightly spaced relationship from the inner wall 58 of the manifold 32 when the vanes 56 move by said inner wall 58.

The said inner wall 58 of manifold 32 has a plurality of openings 60 therein as best seen in FIG. 4, said openings 60 being in the form of elongated passages permitting the flow of fluid from within manifold 32, through openings 60, whereby to impinge upon vanes 56 and thereby cause rotation of turbine 28 about its central shaft 30. It should be noted that the vanes 56, which are an integral part of turbine 28, extend from the peripheral edge 62 of drum 54 in one direction, the said vanes being inclined relative to peripheral edge 62. The openings 60 in inner wall 58 of manifold 32, are inclined relative to peripheral edge 62 in a direction opposite to that in which vanes 56 are inclined, whereby the gas passing through the openings 60 will be directed perpendicularly against the vanes 56, as best illustrated in FIG. 4. This provision of multiple openings 60 disposed with respect to vanes 56 as above described, allows the flow of a large amount of gas through body 10, while efficiently and accurately measuring such flow.

Upon actuation of turbine 28, and more particularly the central shaft 30 thereof, the rotative movement created by oxygen passing through body 10 is transferred to a gear train broadly designated as 64, and comprising a first gear 66, a second gear 68, and a third gear 70, all operably interconnected by suitable additional gears as illustrated, the said gear 66 being operably coupled to shaft 30 of turbine 28 by a smaller gear such as 72.

Gear 70 is operably coupled to a bevel gear assembly 74, which in turn is operably coupled to suitable indicia means broadly designated as 76. These indicia means 76 may take any desired form but, in the embodiment chosen for illustration, are in the form of a plurality of rotatable cylinders, each having numerals thereupon, the cylinders being preset to rotate upon being actuated through bevel gear assembly 74, whereby to indicate to the user of the subject apparatus, the amount of oxygen which has passed through the flow measuring apparatus.

A lens plate 78 which may be of a magnifying glass if desired, is carried by cover plate 12 at a position overlying the indicia means 76, whereby the appropriate numerals of said indicia means may be viewed through said lens plate 78 when it is desired to read the apparatus.

From the foregoing, it will be appreciated that when the subject apparatus is to be placed into use, the hollow body 10 is interposed in an oxygen supply line by coupling the source of oxygen with inlet bore 16 and by further coupling the tube or the like through which the oxygen is delivered to the patient with outlet bore 18. Thus, as oxygen is delivered from the source, the same passes completely through hollow body 10, and the amount of oxygen passing therethrough is suitably measured and indicated upon indicia means 76.

The measurement is accomplished as a result of the oxygen flowing into manifold 32 and causing rotation of turbine 28 in a manner hereinabove described, the relative spacing between the manifold 32 and the turbine 28 being preset, whereby the subject apparatus may accurately record the amount of oxygen being delivered to the patient.

Manifestly, after the oxygen reaches the interior of hollow body 10 and is directed to manifold 32, all of the oxygen ultimately passes through openings 60 and enters the interior of the hollow body 10, the same then passing outwardly and to the patient through outlet opening 18 which, as above indicated, is coupled to a suitable delivery tube or the like.

Having thus described the invention, what is claimed as new and desired to be secured by Letters Patent is:

1. Flow measuring apparatus comprising a hollow body provided with an inlet bore communicating with the interior of the body; a turbine rotatably carried within said body; an arcuate manifold embracing a portion of said turbine, said manifold being in communication with the inlet bore and having a plurality of openings therein whereby fluid flowing into the manifold is directed against the turbine to rotate the latter; indicating means operably coupled with the turbine for measuring the number of revolutions of the turbine; and an outlet opening communicating with the interior of the body, said manifold being pivotally mounted whereby to allow adjustment of the spacing between the manifold and the turbine.

2. Flow measuring apparatus comprising a hollow body provided with an inlet bore communicating with the interior of the body; a turbine rotatably carried within said body; an arcuate manifold embracing a portion of said turbine, said manifold being in communication with the inlet bore and having a plurality of openings therein whereby fluid flowing into the manifold passes through said openings and impinges upon the turbine; indicating means operably coupled with the turbine for measuring the number of revolutions of the turbine; an outlet opening communicating with the interior of the body; and means at one end of the manifold for adjusting the spacing between the manifold and the turbine.

3. Flow measuring apparatus comprising a hollow body provided with an inlet bore communicating with the interior of the body; a turbine rotatably carried within said body, the turbine including a drum and a plurality of vanes extending radially from the drum; an arcuate manifold embracing a portion of the turbine, said manifold being in communication with the inlet bore and having a plurality of openings therein whereby fluid flowing into the manifold passes through said openings and impinges upon the vanes to cause rotation of the turbine; indicating means operably coupled with the turbine for measuring the number of revolutions of the turbine; and an outlet opening communicating with the interior of the body, said vanes extending from the peripheral edge of said drum and being inclined in one direction relative thereto, the openings in the manifold being inclined in the opposite direction relative to said peripheral edge of the drum, whereby to cause the fluid passing through said opening to perpendicularly impinge upon said vanes, said manifold having one end thereof pivotally mounted whereby to allow adjustment of the spacing between the manifold and the turbine.

4. Flow measuring apparatus as set forth in claim 3, there being adjusting means positioned at the opposite end of the manifold.

5. Flow measuring apparatus as set forth in claim 4, there being a slot formed in said opposite end of the manifold, said adjusting means taking the form of a rotatable pin having an eccentric portion, said eccentric portion being received within said slot.

(References on following page)

References Cited by the Examiner

UNITED STATES PATENTS

| | | | |
|---|---|---|---|
| 314,480 | 3/85 | Rosenkrantz et al. | 73—229 |
| 966,050 | 8/10 | Ramage | 73—229 |
| 1,355,165 | 10/20 | Rasch | 73—229 |
| 2,949,764 | 8/60 | Knauth | 73—3 |

FOREIGN PATENTS

| | | |
|---|---|---|
| 436,856 | 11/26 | Germany. |
| 146,612 | 7/20 | Great Britain. |
| II-14-529 | 5/83 | Italy. |

RICHARD C. QUEISSER, *Primary Examiner.*

ROBERT EVANS, *Examiner.*